United States Patent
Rixen et al.

(10) Patent No.: US 9,599,136 B2
(45) Date of Patent: Mar. 21, 2017

(54) FASTENING SYSTEM

(71) Applicants: Wolfgang Rixen, Solingen (DE); Gerrit Pies, Solingen (DE)

(72) Inventors: Wolfgang Rixen, Solingen (DE); Gerrit Pies, Solingen (DE)

(*) Notice: Subject to any disclaimer, the term of this patent is extended or adjusted under 35 U.S.C. 154(b) by 57 days.

(21) Appl. No.: 14/421,832

(22) PCT Filed: Aug. 14, 2013

(86) PCT No.: PCT/EP2013/002450
§ 371 (c)(1),
(2) Date: Feb. 15, 2015

(87) PCT Pub. No.: WO2014/026767
PCT Pub. Date: Feb. 20, 2014

(65) Prior Publication Data
US 2015/0211560 A1   Jul. 30, 2015

(30) Foreign Application Priority Data
Aug. 15, 2012 (DE) ............... 20 2012 007 790 U

(51) Int. Cl.
*F16B 7/04*  (2006.01)
*F16B 7/18*  (2006.01)

(52) U.S. Cl.
CPC ............ *F16B 7/048* (2013.01); *F16B 7/044* (2013.01); *F16B 7/185* (2013.01); *F16B 7/187* (2013.01); *Y10T 403/3906* (2015.01)

(58) Field of Classification Search
CPC ........ F16B 37/042; F16B 37/045; F16B 7/18; F16B 7/185; F16B 7/187; F16B 7/044;
(Continued)

(56) References Cited

U.S. PATENT DOCUMENTS 6,837,661 B2 * 1/2005 Schwarz ............... F16B 37/045
411/552
6,935,804 B2 * 8/2005 Karlinger ............... F16B 7/187
403/252

(Continued)

FOREIGN PATENT DOCUMENTS

DE   89 08 669 U1   11/1989
DE   93 13 596 U1   10/1993
(Continued)

*Primary Examiner* — Matthieu Setliff
(74) *Attorney, Agent, or Firm* — Gudrun E. Huckett

(57) ABSTRACT

Disclosed is a fastening system (10) for fastening two first and second profile bars (16, 18) which have a first and second groove (12, 14) respectively, comprising a fastening body (20) that has feather-key-like first and second projections (30, 32) which extend into first and second groove openings (34, 36) in the assembled state, the projections (30, 32) being provided with first and second screw bores respectively which extend into one of the respective groove openings (34, 36) in jaw-like manner, the respective first and second hammer heads each being freeform heads which impart a twist, the first and second shafts being located partially within the groove openings (34, 36) in the assembled state and first and second noses being arranged approximately diagonally to each other at each hammer head screw (22, 24) at the transition between hammer head and shaft, which noses lie against the jaw-like screw bores (38, 40) in the assembled state so as to inhibit rotation.

12 Claims, 5 Drawing Sheets

(58) Field of Classification Search
CPC ...... F16B 7/048; F16B 7/0486; F16B 7/0493; F16B 35/06; Y10T 403/4662; Y10T 403/7005; Y10T 403/7073; Y10T 403/7016; Y10T 403/7094; Y10T 403/1691
See application file for complete search history.

(56) References Cited

U.S. PATENT DOCUMENTS

| | | | |
|---|---|---|---|
| 7,137,753 B2 * | 11/2006 | Herb | F16B 7/0473 403/348 |
| 2012/0045275 A1 | 2/2012 | Vollmer | |
| 2013/0091691 A1 * | 4/2013 | Oetlinger | F16B 12/50 29/525.02 |

FOREIGN PATENT DOCUMENTS

| | | | | |
|---|---|---|---|---|
| DE | 42 44 396 | | 6/1994 | |
| DE | 10 2007 005439 | | 8/2008 | |
| DE | 20 2010 008312 U1 | | 10/2010 | |
| EP | 0136264 A2 * | | 4/1985 | ........... B61D 17/403 |
| EP | 0647555 B1 * | | 12/1997 | ........... B61D 17/041 |

* cited by examiner

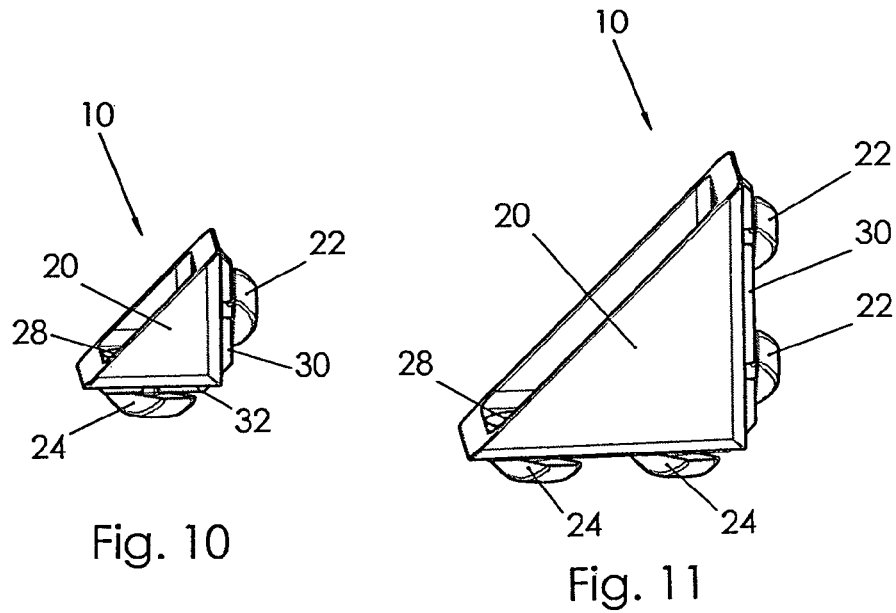
Fig. 10
Fig. 11
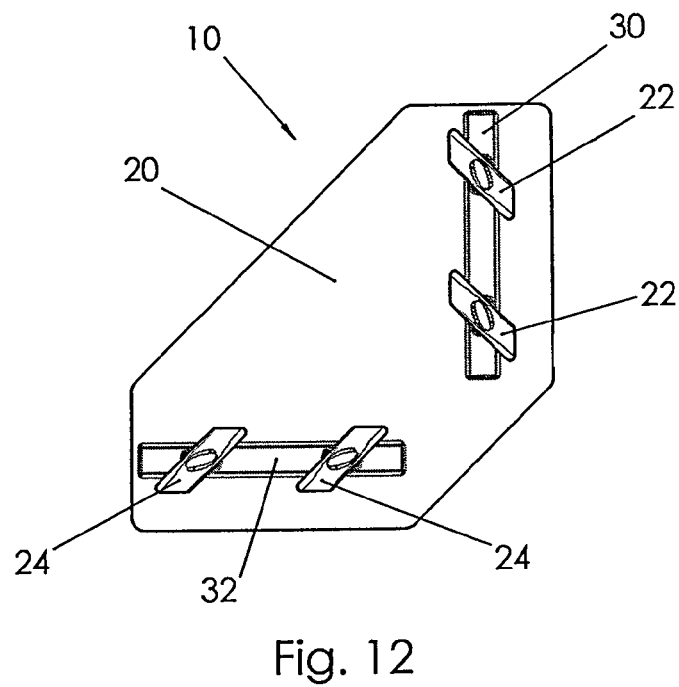
Fig. 12

FASTENING SYSTEM

BACKGROUND OF THE INVENTION

The invention concerns a fastening system for fastening two first and second profile bars, provided with at least one first or one second groove, respectively, at a predetermined angle relative to each other, comprising a fastening body which is attached in the mounted state to the first and second profile bars by means of first and second hammerhead screws inserted into the first and second grooves with first and second screw nuts.

In principle, such fastening systems or connecting systems for attaching two profile bars that are provided with at least one first or one second groove, respectively, are known.

For these known fastening systems there exists however the problem that the hammerhead screws or nuts will turn randomly. Therefore, for mounting on the profile bar they must first be rotated in groove direction, otherwise they block insertion mutually. This is in particular very time consuming for several hammerhead screws.

The object of the invention is therefore to provide a fastening system of the aforementioned kind that, with technically simple means, enables an easy and simple insertion of the hammerheads into the grooves and, at the same time, reduces the mounting time or mounting expenditure noticeably.

SUMMARY OF THE INVENTION

This object is solved for a fastening system of the aforementioned kind in accordance with the invention such that the fastening body comprises feather key-like first and second projections which, in the mounted state, project into first and second groove openings, wherein the projections are provided with at least one first or one second screw bore, respectively, which project jaw-like into a respective groove opening, wherein the respective first and second hammerheads are in the form of freeform heads which exert a twist action, which upon mounting with slight pressure are contacting, respectively, two first and second groove flank points that are far removed from each other and, in this way, automatically align in the longitudinal groove direction and subsequently move into the grooves, wherein the slants of the surfaces of the hammerheads at these groove flank points generate an inwardly turning moment, wherein the first and second shafts in the mounted state are partially located within the groove openings and each hammerhead screw at the transition between hammerhead and shaft comprises first and second noses, approximately diagonally arranged relative to each other, which in the mounted state are resting on the jaw-like screw bores so as to limit rotation.

The gist of the invention resides in this context in the following three main components:

- The connecting element comprises on the side which is facing the groove a kind of feather key which is extending jaw-like underneath the screw bore.
- The hammerhead screw comprises at the lower end of its shaft, i.e., directly above the head, two small noses which project into the "jaws" of the connecting element and in this way form a rotation angle limitation. Accordingly, rotation of the screw outside of this range of use (0° for joining, 45° in the fastening position) is prevented.
- As a third feature, the freeform head of the hammerhead screw comprises a twist action. The latter causes the hammerhead screw, should it contact in the fastening position the groove, to rotate back automatically in the groove direction. This is effected in that the hammerhead screw contacts the groove flanks of the profile only at two points which are far removed from each other and the slant of the surface at these points generates an inward-turning moment.

With this combination, a technician is capable of taking the fastening system out of the package and of connecting, with simple manipulations for insertion into the appropriate grooves, the hammerhead screws with the fastening body and then, without paying attention to the screws, of inserting them into the profiles to be connected.

Accordingly, this connecting technology is very time efficient and very suitable for mounting by a single person.

According to a further embodiment of the invention, it is provided that the jaw-like screw bores with their longer opening extend in longitudinal direction of the projections. In this way, the inserted hammerhead screws are imparted already with a certain pre-alignment in the longitudinal groove direction.

In this context, it is advantageous when the longer opening limits the rotation of the noses about the center point of the screw bores, at both sides of the longitudinal axis of the projection, to an angle β of 22° to 23°, preferably to 22.5°. In this way, the aforementioned alignment of the hammerheads is possible in a particularly simple way.

Moreover, it is advantageous when the jaw-like screw bores are delimited by two concentric circular sections.

In order for the screw nut heads not to project out of the plane of the fastening body when the fastening system is completely mounted, it is advantageous when the fastening body is provided at the screw bores with cylinder-shaped first and second depressions.

An even better friction surface of the screw nut at the fastening body is provided when third and fourth truncated cone-shaped depressions adjoin the depressions and the first and second screw nuts are appropriately shaped. By means of this truncated cone-shaped depression, the surface area of the contacting body parts of the screw nut with the fastening body is increased.

Checking the correct position of the completely mounted hammerhead screws is enabled when the free end faces of the first and second shafts are provided with first and second position markings.

This can be advantageously even more improved when the screw bores are provided with first and second markings corresponding with the first and second position markings for illustrating the desired position of the first and second hammerhead screws.

Of course, the shape of the fastening bodies can be freely selected within the limits of feasibility. It is however advantageous when the fastening body is plate-shape, angular, or has a hollow angle piece shape.

In this context, the plate-shaped fastening bodies, in case of profiles which have several undercut grooves, can also be arranged at both surfaces of the profile bars provided with undercut grooves.

At the same surfaces, also angular plates can be attached wherein the technician is free to provide at both sides an angular plate, respectively, and to attach additionally a so-called hollow angle piece fastening unit between these plates to the profile bars which are perpendicular to each other in this case.

According to a further embodiment of the invention, it is provided that the fastening body is shaped also for connecting angles between the two profile bars which are in a range of 0° to 180°. In this way, it is possible to secure the two profile bars to be fastened at any desired angular degree between them. Most frequently, however, angles of 90° and 45° will be encountered.

According to a further embodiment of the invention, it is provided that the fastening body is comprised of a pressure die cast aluminum element.

It has been found to be particularly advantageous that the individual parts of the fastening system are preassembled. With the dimensionally accurate preassembly, maximally one rotation of the fastening nuts is sufficient in order to mount the fastening system.

BRIEF DESCRIPTION OF THE DRAWINGS

Further features and advantages of the invention result from the following description of several embodiments as well as from the drawings to which reference is being had. It is shown in:

FIG. 10 a further embodiment of a fastening system in the form of the so-called hollow angle piece wherein the corresponding hammerheads project at both legs;

FIG. 11 an illustration very similar to FIG. 10, but with two first and second hammerhead screws on the legs, respectively; and FIG. 12 a triangular fastening plate according to a further embodiment also with two first and second hammerhead screws, respectively, wherein the tip of the triangle shape has been omitted.

DESCRIPTION OF PREFERRED EMBODIMENTS

Figure 1:
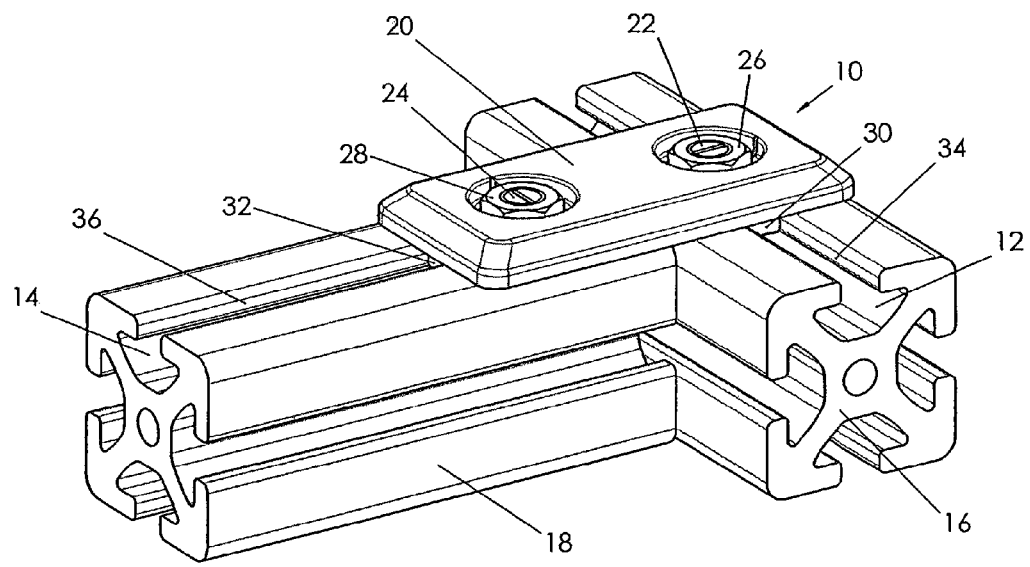
FIG. 1 a perspective view of a first embodiment of a fastening system of two profile bars arranged in a T shape relative to each other.
Figure 2:
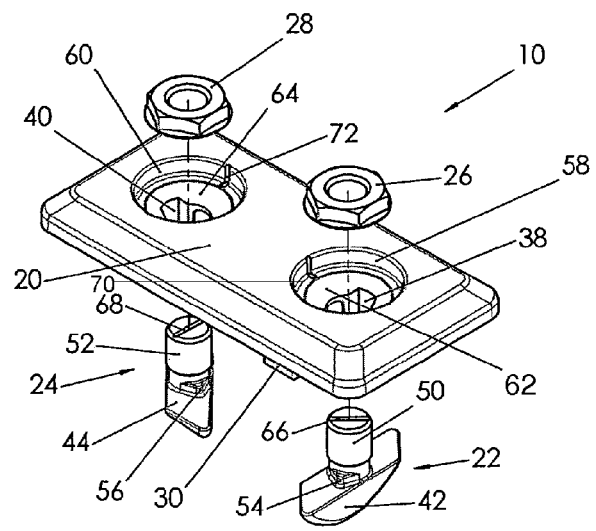
FIG. 2 a perspective exploded illustration of the individual parts of the fastening system shown in FIG. 1.
Figure 3:
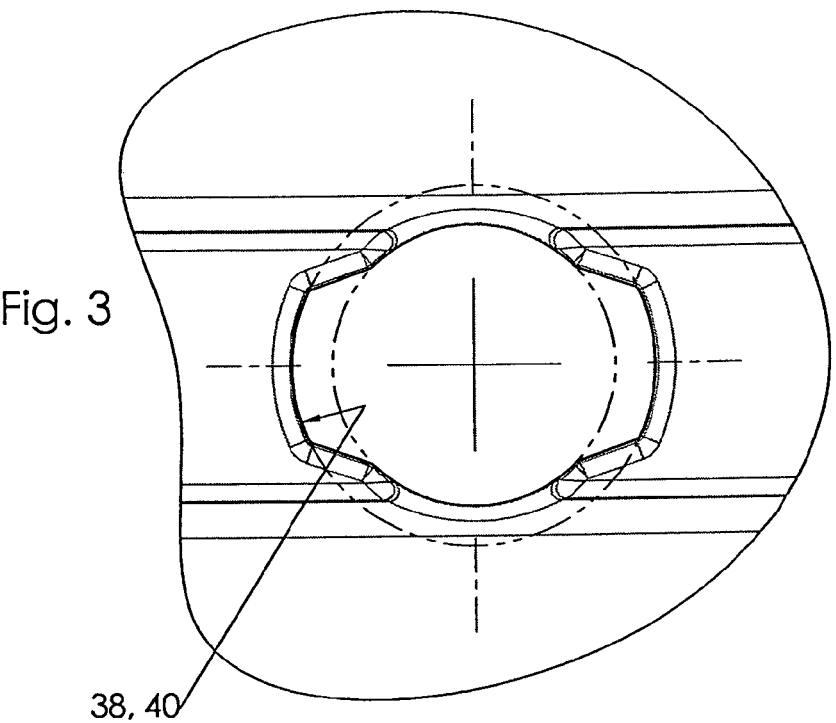
FIG. 3 a plan view onto a screw bore for receiving the shaft of a hammerhead screw.
Figure 4:
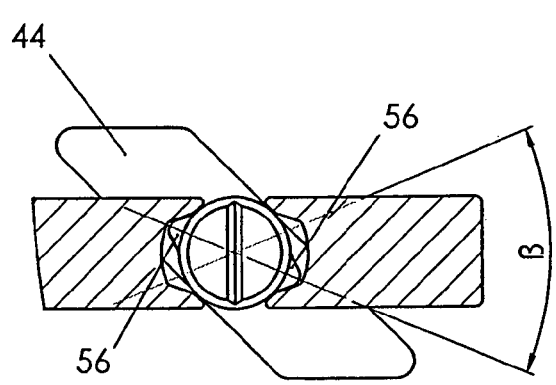
FIG. 4 a view similar to FIG. 3 of the screw bore with inserted hammerhead screw as well as a projection which secures the hammerhead screw against rotation in the fastening state by means of the two diagonally arranged noses.
Figure 5:
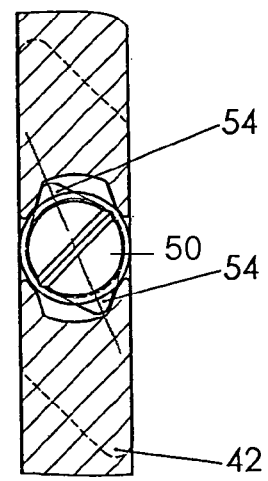
FIG. 5 an illustration similar to FIG. 4, but with the hammerhead in the insertion state for the groove opening.

With the aid of FIGS. 1 to 12, several embodiments for attachment of a fastening system 10 for fastening two first and second profile bars 16, 18, comprising at least one first or one second groove 12 and 14, respectively, will be described. In this context, if not indicated otherwise, same or similar parts are provided with the same reference numbers.

In the fastening systems 10 illustrated in FIGS. 1, 2, 8, and 9, the fastening body 20 is that of a first embodiment. The further possible embodiments of a fastening system are illustrated in FIGS. 10 through 12.

In this context, each fastening body 20 comprises feather key-like first and second projections 30 and 32. These first and second projections 30, 32 then project in the mounted state in first and second groove openings 34 and 36. Here, each one of the projections 30, 32 or each fastening body 20 at the projections 30 and 32 comprises first and second screw bores 38 and 40 which project jaw-like into the groove openings 34, 36 in the mounted state. In this context, it is understood that hammerhead screws 22, 24 each are fixed with first and second screw nuts 26 and 28 on the fastening body 20.

A second important point is that the first and second hammerhead screws 22 and 24 each are provided with first and second hammerheads 42, 44, which are embodied as freeform heads that exert a twist action. This means that, upon assembly with light pressure, the appropriately guided hammerheads 42, 42 are contacting two far removed first and second groove flank points 46 and 48 and, in this way, essentially automatically will be aligned in the longitudinal groove direction upon assembly and subsequently will move into the grooves 12 and 14.

This is possible only in that the hammerheads 42, 40 comprise the so-called freeform which is designed so as to impart a twist action on the hammerheads 42, 44. Since the hammerheads 42, 44 do not comprise defined shapes, the term freeform head is used as a description of the contour.

In order for the so-called freeform to be able to exert its effect, it is furthermore also important that each hammerhead screw 22, 24 at the transition between hammerhead 42, 44 and the adjoining shaft 50, 52 has first and second noses 54, 56 and the latter are arranged approximately diagonally relative to each other in alignment.

These noses 54, 56 engage then the respective elongated area of the screw bore 38, 40 and limit in this way the capability for rotation of the entire hammerhead screws 22, 24 to this small circular sector.

The thereby permitted rotation action relative to the center point of the screw bore 38, 40 should be approximately 22° to 23° toward both sides of the longitudinal projection axis, preferably however 45/2°, i.e., 22.5°.

In this way, and due to the configuration of the freeform of the hammerhead 42, 44, it is then possible that the first and second groove flank points 46 and 48 are contacted by the farthest removed points of the hammerheads 42 and 44. The hammerheads 42 and 44 are moved into this position as a result of the twist-like rotation and they can then move completely into the groove 12 or 14 in a simple way.

Figure 6:
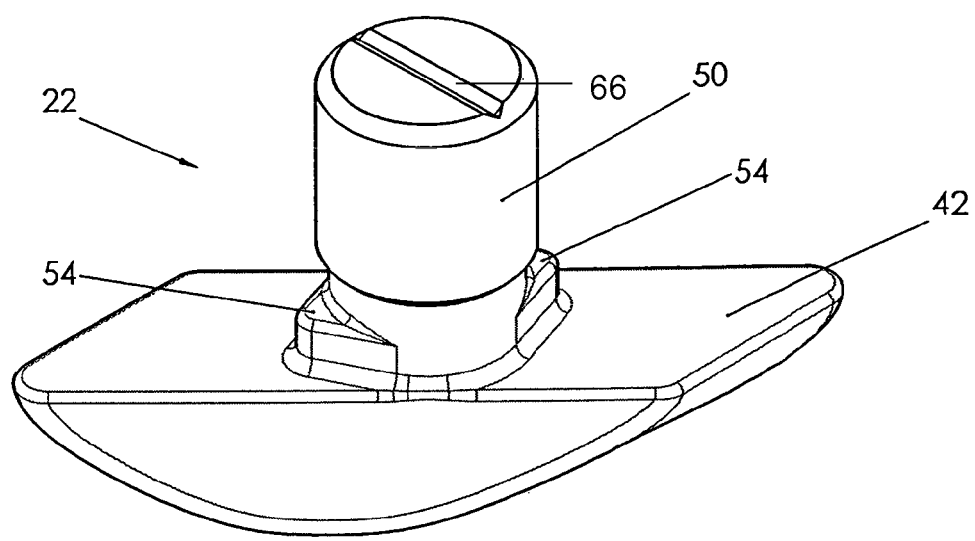
FIG. 6 a perspective view of a hammerhead screw wherein the weakly shown "contours" are meant to indicate the freeform of the hammerhead and of the two noses.
Figure 7:
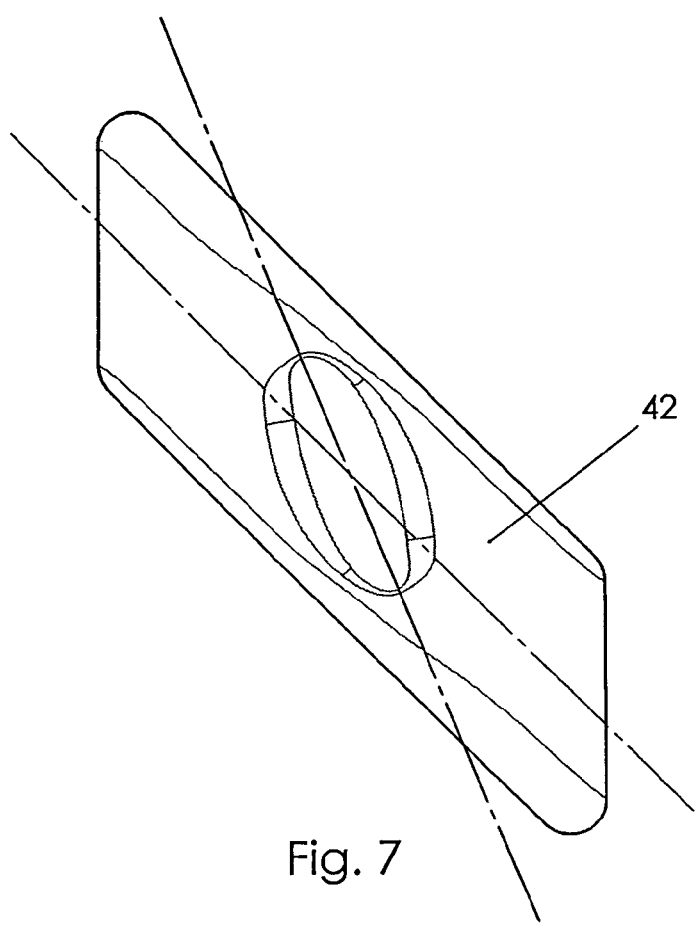
FIG. 7 a bottom view of the hammerhead wherein herein also the weaker lines indicate the freeform of the head.
Figure 8:
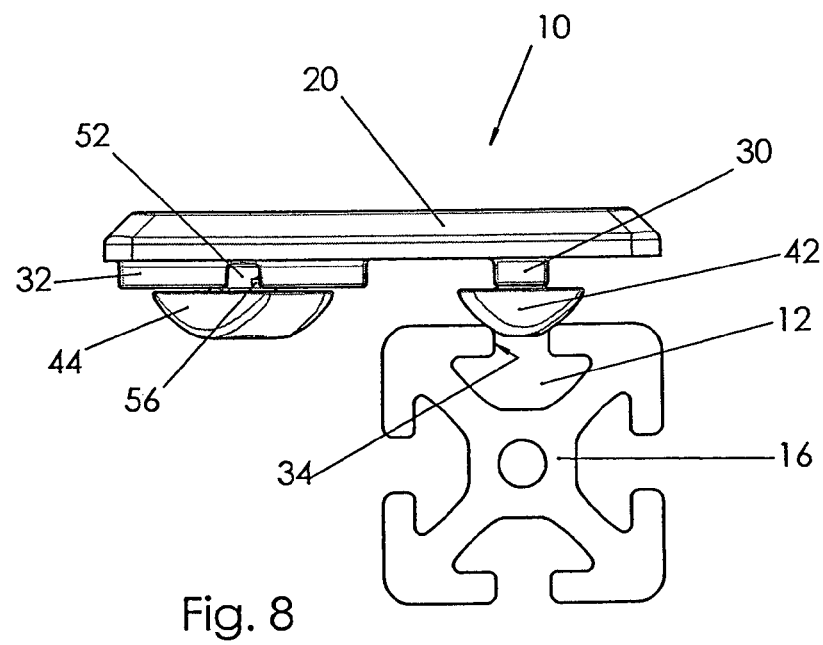
FIG. 8 a side view of the embodiment according to FIG. 2 with one profile bar omitted.
Figure 9:
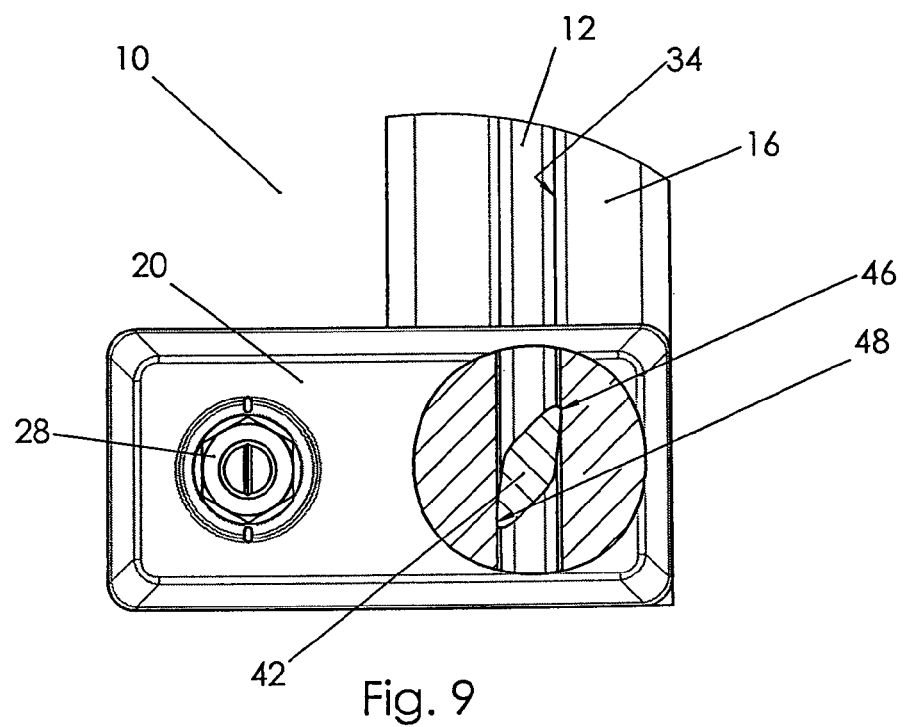
FIG. 9 a plan view of the fastening system with profile bar according to FIG. 8.

The freeform heads 42 and 44 can be seen best in the FIGS. 6 and 7. In this context, it should be noted that the weakly illustrated lines are not to be understood as defined contours but are only meant to indicate the freeform.

The first and second screw bores 38 and 40 are shaped such that they are comprised of two concentric circles of different radii and in this way form the jaw-like opening. This can be seen particularly well in FIG. 3.

In order for the screw nuts 26 and 28 to not project from the surface of the fastening body 20 after having been fastened, first and second depressions 58 and 60 are provided.

In order to provide an even greater friction force between the screw nuts 26 and 28 and the fastening bodies 20, the first and second depressions 58 and 60 are extended so as to conically taper with third and fourth truncated cone-shaped depressions 62 and 64.

Of course, each screw nut 26, 28 is then provided with a truncated cone-shaped projection.

Moreover, all embodiments have in common that the free end faces of the first and second shafts 50 and 52 are provided with first and second position markings 66 and 68. These position markings 66 and 68 are comprised in the shown embodiment of a simple notch in the end face of the shafts 50 and 52. The orientation of these position markings 66 and 68 is selected such that in the fastened state of the fastening body 20 or of the fastening system 10 they extend approximately transverse to the longitudinal groove direction.

In order for a technician to be completely sure that in particular in an embodiment according to FIG. 1 the hammerheads 42 and 44 are in the fastening position, first and second markings 70 and 72, corresponding with the first and second position marking 66 and 68, are arranged on the screw bores 38, 40. When all of these markings are then aligned, the technician can be sure that the hammerheads 42 and 44 are in proper fastening position.

The fastening body 20 can be plate-shaped as a rectangular plate according to FIG. 1, angular as in the embodiment according to FIG. 12, or also a hollow angle piece as illustrated in FIGS. 10 and 11. Moreover, the two drawings FIGS. 11 and 12 show that also for each fastening side or for each fastening nose more than one hammerhead can be used in order to obtain high stability.

Moreover, it is also possible to combine several fastening bodies 20. For example, it is possible to employ a triangular plate shape according to FIG. 12 together with one of the two hollow angle piece fastening bodies 20 according to FIG. 10 or 11. In this way, the fastening forces can be greatly increased.

Also, it is possible, which is not illustrated in the Figures, to employ different connecting angles between the two profile bars 16 and 18. In this context, a range between 0° and 180° can be employed, wherein however these extreme values 0° and 180° will not be as frequent as possibly 90° and 45°.

Preferably, the fastening bodies 20 are comprised of a pressure die cast aluminum element.

Even though for a technician a significant time savings is already provided by using the fastening systems 10 according to the invention because it is not necessary to pre-position individual sliding blocks or hammerhead screws and to then also position the matching screws so as to coincide with the appropriate openings of the fastening angle piece, it is in particular even more advantageous when the fastening systems 10 are produced to be already preassembled. In this case, the technician must only take the fastening system 10 from the package and provide the grooves with the appropriate hammerheads by simple placement thereof under a slight pressure and tighten with one rotation the corresponding screw nuts n order to provide a fixed connection within a very short amount of time.

List of Reference Characters
10 fastening system
12 first groove
14 second groove
16 first profile bar
18 second profile bar
20 fastening body
22 first hammerhead screw
24 second hammerhead screw
26 first screw nut
28 second screw nut
30 first projection
32 second projection
34 first groove opening
36 second groove opening
38 first screw bore
40 second screw bore
42 first hammerhead
44 second hammerhead
46 first groove flank point
48 second groove flank point
50 first shaft
52 second shaft
54 first nose
56 second nose
58 first depression
60 second depression
62 third depression
64 fourth depression
66 first position marking
68 second position marking
70 first marking
72 second marking

What is claimed is:

1. A fastening system for fastening a first profile bar, having a first groove with a first groove opening, and a second profile bar, having a second groove with a second groove opening, relative to each other at a predetermined angle; the fastening system comprising:

a fastening body comprising a top face and a bottom face opposite the top face, the fastening body further comprising a first projection arranged at the bottom face and insertable into the first groove opening and a second projection arranged at the bottom face and insertable into the second groove opening;

wherein the first projection comprises at least one first screw bore and the second projection comprises at least one second screw bore, wherein the first screw bore comprises two diagonally opposed first radial recesses and wherein the second screw bore comprises two diagonally opposed second radial recesses;

a first hammerhead screw comprising a first shaft and a first hammerhead and further comprising at a transition between the first hammerhead and the first shaft, first noses arranged approximately diagonally relative to each other, wherein the first hammerhead screw is arranged on the fastening body such that the first shaft is positioned in the first screw bore and is accessible from the top face and the first hammerhead is arranged at the bottom face and projects downward past the first projection;

a second hammerhead screw comprising a second hammerhead and a second shaft and further comprising, at a transition between the second hammerhead and the second shaft, second noses arranged approximately diagonally relative to each other, wherein the second hammerhead screw is arranged on the fastening body such that the second shaft is positioned in the second screw bore and is accessible from the top face and the second hammerhead is arranged at the bottom face and projects downward past the second projection;

wherein the first hammerhead is a first freeform head that is insertable through the first groove opening into the first groove and upon insertion generates an inwardly turning moment by contacting with slanted surfaces of the first freeform head opposed groove flanks of the first groove opening only at two groove flank points that are remote from each other and automatically aligns relative to the first groove in a first longitudinal groove direction and moves into the first groove;

wherein the second hammerhead is a second freeform head that is insertable through the second groove opening into the second groove and upon insertion generates an inwardly turning moment by contacting with slanted surfaces of the second freeform head opposed groove flanks of the second groove opening only at two groove flank points that are remote from each other and automatically aligns relative to the second groove in a second longitudinal groove direction and moves into the second groove;

a first screw nut configured to be screwed onto the first shaft on the top face and a second screw nut configured to be screwed onto the second shaft on the top face, wherein the first and second screw nuts are tightened to secure the fastening body on the first and second profile bars when the fastening body is inserted with the first and second projections and the first and second hammerheads in the first and second grooves;

wherein the first noses of the first hammerhead screw are positioned in the first radial recesses of the first screw bore and limit rotation of the first hammer head screw when the first nut is tightened;

wherein the second noses of the second hammerhead screw are positioned in the second radial recesses of the second screw bore and limit rotation of the second hammer head screw when the second nut is tightened.

2. The fastening system according to claim 1, wherein the first screw bore has a first long opening extension in a direction of the diagonally opposed first radial recesses and a short opening extension, wherein the first long opening extension extends in a longitudinal direction of the first projection, and wherein the second screw bore has a second long opening extension in a direction of the diagonally opposed second radial recesses and a short opening extension, wherein the second long opening extension extends in a longitudinal direction of the second projection.

3. The fastening system according to claim 2, wherein the first long opening extension limits a rotation of the first and second noses of the first hammerhead screw about a center point of the first screw bore at both sides of the longitudinal direction of the first projection to a range of 22° to 23°, and wherein the second long opening extension limits a rotation of the first and second noses of the second hammerhead screw about a center point of the second screw bore at both sides of the longitudinal direction of the second projection to a range of 22° to 23°.

4. The fastening system according to claim 1, wherein the first and second screw bores each are delimited by two concentric circular sections.

5. The fastening system according to claim 1, wherein the fastening body is provided at the first screw bore with a cylinder-shaped first depression and is provided at the second screw bore with a cylinder-shaped second depression.

6. The fastening system according to claim 5, wherein the first depression is adjoined by a truncated cone-shaped third depression and the second depression is adjoined by a truncated cone-shaped fourth depression, wherein the first screw nut is shaped to match the third depression and the second screw nut is shaped to match the fourth depression.

7. The fastening system according to claim 1, wherein a free end face of the first shaft is provided with a first position marking and wherein a second free end face of the second shaft is provided with a second position marking.

8. The fastening system according to claim 7, wherein the first screw bore comprises a first marking and the second screw bore comprises a second marking, wherein the first marking of the first screw bore corresponds to the first position marking and the second marking of the second screw bore corresponds to the second position marking for illustrating a desired position of the first and second hammerhead screws, respectively.

9. The fastening system according to claim 1, wherein the fastening body is comprised of a pressure die cast aluminum element.

10. The fastening system according to claim 1, wherein the fastening body is plate-shape, angular, or a hollow angle piece.

11. The fastening system according to claim 10, wherein the fastening body is formed to accommodate a connecting angle between the first and second profile bars within a connecting angle range of 0° to 180°.

12. The fastening system according to claim 1, wherein the fastening body, the first and second hammerhead screws, and the first and second screw nuts are preassembled in that the first and second hammerhead screws are inserted from the bottom face of the fastening body into the first and second screw bores, respectively, and the first and second screw nuts are screwed from the top face of the fastening body onto the first and second shafts, respectively.

* * * * *